US012074402B2

(12) United States Patent
Becherer

(10) Patent No.: US 12,074,402 B2
(45) Date of Patent: Aug. 27, 2024

(54) CERAMIC INSULATION CONNECTOR

(71) Applicant: VEGA Grieshaber KG, Wolfach (DE)

(72) Inventor: Frank Becherer, Neuried Ichenheim (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 18/305,496

(22) Filed: Apr. 24, 2023

(65) Prior Publication Data

US 2023/0344157 A1 Oct. 26, 2023

(30) Foreign Application Priority Data

Apr. 25, 2022 (DE) .................... DE 10 2022 109 92

(51) Int. Cl.
*H01R 13/533* (2006.01)
*H01R 4/18* (2006.01)
*H01R 4/30* (2006.01)
*H01R 4/70* (2006.01)

(52) U.S. Cl.
CPC ................. *H01R 4/70* (2013.01); *H01R 4/18* (2013.01); *H01R 13/533* (2013.01); *H01R 4/30* (2013.01)

(58) Field of Classification Search
CPC ........ H01R 11/01; H01R 13/533; H01R 4/18; H01R 4/30; H01R 4/38; H01R 4/70
USPC ........................................................ 174/84 R
See application file for complete search history.

(56) References Cited

FOREIGN PATENT DOCUMENTS

| | | | | | |
|---|---|---|---|---|---|
| CN | 110233364 | A | | 9/2019 | |
| CN | 112510391 | A | * | 3/2021 | ............... H01R 9/03 |
| DE | 19711376 | A1 | | 12/1997 | |
| DE | 19740456 | A1 | * | 3/1999 | ........... G01N 27/407 |

OTHER PUBLICATIONS

First Office Action issued by the German Patent and Trademark Office on the priority application, dated Jan. 13, 2023.
DE10 2022 109 924.5, Decision to Grant dated May 11, 2023.

* cited by examiner

*Primary Examiner* — Timothy J Thompson
*Assistant Examiner* — Guillermo J Egoavil
(74) *Attorney, Agent, or Firm* — Wood Herron & Evans LLP

(57) ABSTRACT

The invention relates to an insulating connector 1 comprising a ceramic basic body for accommodating at least two electrical conductors, wherein one electrical conductor, respectively, is contacted with another electrical conductor, and the insulating connector comprises a ceramic sleeve that can assume a released position and a fixed position, wherein the electrical conductors are fixed by the sleeve to the ceramic basic body in the fixed position.

16 Claims, 6 Drawing Sheets

CERAMIC INSULATION CONNECTOR

RELATED APPLICATIONS

The application claims priority to German application no. DE 10 2022 109 924.5 filed Apr. 25, 2022, which is incorporated by reference herein in its entirety.

BACKGROUND OF THE INVENTION

The invention relates to an insulating connector with a ceramic basic body for accommodating at least two electrical conductors and a ceramic sleeve for fixing the electrical conductors to the basic body. The invention further relates to an assembly of at least two electrical conductors in an insulating connector.

Plug-in connectors for connecting electrical conductors are known from the prior art. In document DE19711376, for example, the electrical conductors are electrically contacted with one another by means of a plug and a coupling. For this purpose, the electrical conductors are connected in the plug or the coupling with coupling contacts mounted in insulating components of the plug or coupling. In order to securely contact the coupling members with one another, the coupling contacts are displaceably mounted and are biased against each other in the contacted state by a compression spring.

However, such plug-in connections consist of many individual parts, with some of the components having complex geometries. Therefore, the components of such plug-in connections are most frequently produced from plastic by means of injection molding. Components with complex geometries can be readily produced by injection molding. However, the processible materials in such manufacturing processes are generally not suitable for use at high temperatures.

SUMMARY OF THE INVENTION

It is therefore the underlying object of the invention to provide an insulating connector and an assembly of at least two electrical conductors in an insulating connector capable of reliably connecting electrical conductors even in high-temperature applications.

High-temperature application within the sense of the present patent application are applications in which temperatures of more than 200° C., in particular more than 250° C., act on the insulating connector. For a short time, even higher temperatures, such as higher than 300° C., in particular up to 450° C., may act on the insulating connector.

This object is achieved by an insulating connector with the features of claim 1 and further by an assembly of at least two electrical conductors and an insulating connector according to claim 14. Other particularly advantageous embodiments of the invention are disclosed by the respective dependent claims.

It must be noted that the features cited individually in the claims can be combined with each other in any technologically meaningful manner (also across the boundaries of categories, such as method and device) and represent other embodiments of the invention. The description, in particular in connection with the Figures, additionally characterizes and specifies the invention.

It may also be noted that a conjunction "and/or" used hereinafter, which is situated between two features and links them to each other, should always be interpreted such that, in a first embodiment of the subject matter according to the invention, only the first feature may be provided, in a second embodiment, only the second feature may be provided, and in a third embodiment, both the first and the second feature may be provided.

According to the invention, an insulating connector comprising a ceramic basic body for accommodating at least two electrical conductors, wherein one electrical conductor, respectively, is contacted with another electrical conductor, is characterized in that the insulating connector comprises a ceramic sleeve that can assume a released position and a fixed position, wherein the electrical conductors are fixed by the sleeve to the ceramic basic body in the fixed position. In particular, fixed to the basic body means that the electrical conductors are positively fixed against unwanted removal from the insulating connector in the longitudinal direction of the electrical conductors and/or in the radial direction.

The basic body accommodates multiple electrical conductors for contacting, i.e., the electrical conductors are connected such that electrical energy can be conducted from one into the other conductor. For this purpose, generally, a single electrical conductor is contacted, i.e. connected in an electrically conductive manner, with another single electrical conductor. However, more than two electrical conductors may also be connected to each another.

It is also conceivable to contact several electrical conductor pairs, with the electrical conductor pairs having no electrical contact with one another. In this way, cables with several conductors can be connected with one another by means of the insulating connector.

If the electrical conductors are not supposed to be contacted with one another, as may be the case, for example, with several parallel electrical conductors of a cable, these electrical conductors are spatially separated from each other in the basic body. This may be effected, for example, by means of formations in the basic body separated by webs. The webs spatially separate the electrical conductors from one another and thus insulate the electrical conductors. At the same time, the webs hamper or prevent electrical flashovers and reduce leakage currents between the electrical conductors.

The electrical conductors are accommodated by the basic body and fixed by a ceramic sleeve in this position. For this purpose, the sleeve can be brought from a released position, in which the electrical conductors can be placed or inserted in the basic body, into a fixed position, in which the conductors are fixed on the basic body. Due to the fixation, it is ensured that the electrical conductor remain contacted and cannot slip out of the insulating connector.

The fixation of the electrical conductors can be accomplished, for example, by a clamping device with conically formed accommodating portions for the electrical conductors within the basic body.

A typical electrical conductor may be a cable with an insulating jacket around an electrically conductive core of metal. In this case, the electrically conductive core may consist of a single strand of metal, or be composed of several metallic strands. An electrical conductor composed of several metallic strands is also referred to as a stranded wire.

It may be provided that the electrical contacting of the electrical conductors is accomplished by bringing the sleeve into the fixed position. Thus, if the sleeve is in the released position, the electrical conductors may not or not yet be sufficiently contacted, e.g., if the electrical conductors are loosely placed in the basic body. When the sleeve has then been brought into the fixed position, the electrical conductors may be biased against each other and thus be contacted, or be biased against an electrically conducting device and thus be contacted.

In the released position, the sleeve does not need to have contact with the basic body. It is sufficient if the sleeve can be pushed over the basic body and brought into the fixed position after the electrical conductors have been accommodated, for example. However it is also conceivable that the basic body and the sleeve are connected with each other and that only their position relative to each other is changed in order to get from the released position into the fixed position and back.

In order for the insulating connector to be capable of being used even at high temperatures, the basic body and the sleeve are made from a ceramic, and thus temperature-resistant, material. Thus, the components are dimensionally stable even at high temperatures and retain the mechanical and electrical or insulating properties. Apart from a ceramic material for the basic body and the sleeve, comparably heat-resistant and, at the same time, electrically insulative materials, such as glass, for example, are also conceivable.

Furthermore, ceramic materials, compared with metallic materials, expand only to a small extent in the case of an increase in temperature, so that a high degree of dimensional stability of the basic body and the sleeve remains ensured even at high temperatures. Conventionally, plastics, whose properties also deteriorate at higher temperatures, are used for insulation. Plastics can lose their mechanical stability by softening or melting or by becoming brittle. In the case of a ceramic insulating connector, the insulating connector remains functional even at high temperatures, such as above 200° C. or 250° C., for example, and is impervious with respect to heating and cooling-off cycles.

Advantageous embodiments and variants of the invention become apparent from the dependent claims and the following description. The features cited individually in the dependent claims may be combined in any technologically meaningful manner both with each other and with the features presented in more detail in the following description, and can represent other advantageous embodiment variants of the invention.

In an advantageous embodiment of the insulating connector, the latter is characterized in that the sleeve substantially encloses the basic body. In this case, the sleeve is a hollow body capable of accommodating the basic body in its cavity. The sleeve may have one or more openings so that the basic body can be inserted and/or the electrical conductors can be routed towards the outside.

The sleeve substantially enclosing the basic body means, within the sense of the present application, that parts of the basic body may protrude from the sleeve, and that not all sides of the basic body need to be covered by the sleeve.

In particular, the sleeve may have a substantially cylindrical shape with openings for accommodating the basic body. Preferably, the sleeve has a tube-like shape in this case. In this application, a substantially cylindrical shape refers to a cylindrical basic shape of the sleeve, which was adapted to the functions of the sleeve by design adjustments, such as bores, cut-outs or thickened portions. The basic shape or basic area of the sleeve is configured to be, in particular, circular or rectangular.

A tube-like shape is particularly advantageous if the basic body also has a cylindrical shape. Thus, the electrical conductors may be laid along the cylindrical jacket surface of the basic body and the sleeve may be pushed over the basic body and fix the electrical conductors on the basic body in the process.

Particularly in this embodiment, it may be advantageous if the sleeve and the basic body are adapted to one another such that a rotation of the sleeve and the basic body relative to one another is blocked, preferably blocked in the fixed position, by means of a molded-on portion on the sleeve and a cut-out on the basic body corresponding thereto, or the other way round. This may also be accomplished by a rectangular geometry of the sleeve and the basic body.

Preferably, the sleeve and the basic body are adapted to one another such that the sleeve can be pushed onto the basic body, and in particular is configured so as to be capable of being pushed onto the basic body along the electrical conductors. In this case, along the electrical conductors refers to elongate structural shapes of the electrical conductors, such as cables, stranded wires, wires, pins or conductor paths, for example, wherein the sleeve is supposed to be pushed along the longitudinal axes of the electrical conductors. The longitudinal axes of the electrical conductor extend along the electrical conductors and thus along the flowing direction of the electrical current through the electrical conductors.

In the case of such a structural shape, it is advantageous if the electrical conductors are routed to the outside via an opening in the sleeve. Therefore, the sleeve, in particular, has at least one opening through which the electrical conductors can be inserted.

In one embodiment of the insulating connector, the basic body and the sleeve can be coupled to each other in the fixed position of the sleeve by means of a fixing member. By means of a fixing member, the sleeve is prevented from getting from the fixed position into the released position inadvertently, so that the electrical conductors are prevented from unintentionally becoming detached.

Such a fixing member may be configured as a snap-hook connection, but may also be realized by means of a positive fit of a spring member, of a hoof, of a pin, of a split pin or a wire strap, as well as by a screw connection. Preferably, the basic body and the sleeve are coupled to one another by a positive fit of the fixing member. Such connections permit a very simple and rapid coupling of the sleeve and the basic body and are generally capable of being connected and disconnected without any tools.

Since both the basic body and the sleeve are made from ceramics, it may be advantageous that the fixing member is made from a more flexible material, such as metal, for example.

The fixing member may have an actuating region, upon whose actuation the coupling effect is canceled. Thus, the basic body and the sleeve can be uncoupled from one another again.

The fixing member may also be realized by means of a pin, a wire or a clamp, for example, which reaches into cut-outs in the basic body and the sleeve and thus positively connects the basic body and the sleeve with each other. Such a wire is simple and inexpensive to produce and nevertheless reliably performs its task.

In particular, the fixing member is configured as a wire strap and has two legs that can be made to resiliently move apart and together in an elastic manner. If the two legs are spread or resiliently moved apart by a spreading force, they snap back once the spreading force abates. In particular, fixing portions, which extend inwards or also outwards, perpendicularly to the legs, are formed at the free ends of the legs. In particular, the legs serve for reaching behind the basic body or the sleeve in the fixed position.

In another embodiment of the insulating connector, the fixing member may be capable of being detached without tools, so that the sleeve can be brought into the released position or into the fixed position. When the sleeve is in the released position, the basic body and the sleeve can be uncoupled from one another.

Without tools in this context means that a user needs no additional tools for detaching the fixing member. For example, an actuating region or button may be provided which can be actuated with a finger.

In this case, the fixing member may be detached directly or indirectly, for example, by a lever. When the fixing member is detached, the sleeve can be brought from the fixed position into the released position or vice versa. If the fixing member is not detached, then the sleeve is fixed in the fixed position.

In another embodiment of the insulating connector, the basic body has electrical connecting members for contacting the electrical conductors. Since it is not mandatory that the electrical conductors be directly connected with one another, one option is to contact them by means of electrical connecting members. Thus, an electrical contact connection with defined boundary conditions is established by the connecting members.

Alternatively, two electrical conductors may already be connected with a connecting member and laid into the basic body in the connected state. As will be described below, the basic body has matching cut-outs for this purpose.

Such electrical connecting members mentioned above are conventionally made from metal. The electrical conductors to be contacted are brought into contact with the electrical connecting member, so that electrical energy can flow from one conductor into the other via the connecting member.

The connecting member may be a conventional crimp. The connecting member is then wound around stranded wires, from which the insulation has been removed, of two conductors arranged side by side, and then pressed or deformed. In particular, the connecting member is shaped into a square.

Depending on the configuration of the electrical connecting member, the removal of the insulation of the electrical conductors in the contact region may be omitted. For this purpose, blades or squeezing areas can be provided in the electrical connecting member which, when the electrical conductor is inserted, open its insulation and come in contact with the electrically conductive core of the electrical conductor.

The electrical connecting members may take over other tasks, such as fixing the electrical conductors, for example, by the electrical conductors being clamped in the electrical connecting member. It is also conceivable that the sleeve cooperates with the electrical connecting member, and the electrical conductors are clamped into the electrical connecting member and thus electrically contacted only in the fixed position of the sleeve.

Therefore, the insulating connector in one variant may be configured such that the electrical connecting members electrically contact the electrical conductors the sleeve being pushed onto the basic body. For example, the electrical conductors may be pushed against an electrical connecting member by the sleeve being pushed on, so that the electrical contact with the connecting member is established. It is also conceivable that the electrical conductors are pressed into the above-mentioned blades or squeezing members by the sleeve being pushed on.

It is also conceivable that the electrical conductors are contacted by a soldered connection, preferably by a brazed joint.

In another embodiment of the insulating connector, the basic body has a substantially cylindrical shape. In this application, a substantially cylindrical shape refers to a cylindrical basic shape of the basic body, which was adapted to the functions of the basic body by design adjustments, such as bores, cut-outs or thickened portions. Alternatively, the basic body may have a cuboid shape.

In particular, the basic body has cut-outs, which are incorporated in the jacket surface or cylindrical jacket surface of the basic body. Thus, the electrical conductor may be arranged equidistantly over the circumference of the jacket surface or cylindrical jacket surface about the basic body and thus have the greatest possible distance from one another. Thus, it is ensured that the electrical conductors are contacted only at the intended locations.

The electrical conductors may be connected to one another by means of at least one connecting member. Therefore, it may be advantageous if cut-outs for these connecting members are provided in the basic body, because an electrical contact connection with defined boundary conditions can be established by the connecting members. In particular, the cut-outs are dimensioned such that, respectively, connected pairs of electrical conductors, in particular including the connecting member, can be accommodated therein.

When the electrical conductors are electrically and mechanically connected to one another by connecting members, then, in particular, the connecting members are disposed in the cut-outs of the basic body such that the electrical conductors are prevented from slipping out of the basic body in a longitudinal direction.

In particular, the cut-outs each have two stops which, in the longitudinal direction of the electrical conductors to be connected, are arranged laterally of the connecting member. If the electrical conductors are moved in the longitudinal direction, the connecting member abuts against the respective stop. The stops effect a positive fixation of two electrical conductors connected to one connecting member.

The stops each have recesses or openings through which the conductors, and particularly the stranded wires, can be routed through the stops.

Such connecting members may be larger in their dimensions than the electrical conductors and, in particular, have a greater diameter, so that the cut-outs may be configured such that the connecting members can be laid into the cut-out via a large opening of the cut-out, whereas the electrical conductors can be routed through smaller openings of the cut-outs, through which the connecting members do not fit due to their larger dimensions. The larger opening is then closed by the sleeve in the fixed position, so that the connecting members cannot leave the cut-outs any longer.

Slipping out from the basic body in the longitudinal direction in this case means that the electrical conductors are fixed on the basic body in the direction in which the sleeve is also pushed onto the basic body, i.e. along the electrical conductors themselves.

The connecting members may be clamping connectors, crimp connectors or screw connectors, but may also be formed by soldering tin from a soldered connection. What is important in this case is that the connecting members, and in the particular case the soldered portion with the soldering tin, have greater dimensions than the electrical conductors, such as a larger diameter at the connection point compared with the diameter of the electrical conductor, for example.

If the electrical conductors are connected by means of a spliced connection, the connecting members may also be formed by the electrical conductors themselves. In a spliced connection, the electrical conductors or their individual stranded wires are interlaced and/or knotted at the splicing point, so that the electrical conductors are connected with one another both mechanically and electrically. The splicing point is generally thicker than the electrical conductors taken by themselves.

Also in the case of this connecting technique, it is essential that the connecting members, and in the particular case the splicing point of the spliced connection with the interlaced or knotted electrical conductors, have greater dimensions than the electrical conductors alone, such as a larger diameter at the splicing point compared with the diameter of one electrical conductor alone.

The connecting members may be configured from metal and designed like a sleeve, a clamping strip, a conductor path or the like. In this case, the cut-outs are arranged such that the connecting members do not touch each other when no contacting is intended. For this purpose, webs of the ceramic material of the basic body remain between the cut-outs of the connecting members, for instance.

In another embodiment of the insulating connector with at least two electrical conductors, the basic body is configured such that electrical conductors not to be contacted are arranged in spatial separation from one another. Preferably, the electrical conductors are arranged in spatial separation from one another by separating members, and particularly by ceramic formations on the basic body. Such a spatial separation may be effected by formations in the form of ceramic webs, for example, which extend between the electrical conductors routed parallel to one another. Due to the formations, a reliable electrical insulation of the electrical conductors that are not to be contacted is ensured, even if an electrical conductor becomes loose, for example.

In another embodiment of the insulating connector with at least two electrical conductors, the electrical conductors have end faces at one end, which are arranged opposite each other in the basic body in the case of contacted electrical conductors. Such an end face is the result, for example, of cutting to length an electrical conductor in the form of a cable. The cut-off end of the metallic core of the cable in this case forms the end face.

In particular, the insulating connector is capable of accommodating the electrical conductors to be contacted such that the two end faces of the electrical conductors are situated opposite each other. Thus, a space-saving solution for contacting the electrical conductors is created because the electrical conductors are arranged in an aligned manner, as if the electrical conductor were not cut through at all.

The invention also relates to an assembly of at least two electrical conductors in an insulating connector, in particular in an insulating connector as described above. For this purpose, the electrical conductors are arranged in a ceramic basic body and a ceramic sleeve surrounding the basic body in such a way that the electrical conductors are fixed in the ceramic basic body in a fixed position of the sleeve. In particular, one pair of electrical conductors, respectively, is fixed in both the longitudinal direction of the electrical conductors and in the radial direction.

In particular, two electrical conductors, respectively, are electrically and mechanically connected by means of a connecting member, wherein the connecting member has a larger diameter than the respective other part of the electrical conductors. The connecting member is arranged in a cut-out of the basic body such that the electrical conductors are positively fixed in the longitudinal direction in the basic body. In particular, two stops are formed in the cut-out which, viewed in the longitudinal direction, are respectively arranged on one side of the connecting member. In order to guide the electrical conductor through, the cut-outs have recesses or openings. Viewed in the radial direction, the recesses are each open on one side, i.e. the electrical conductors including the connecting member can be inserted, in the already connected state, into the basic body in the radial direction. The cut-outs are radially sealed on the outside by the sleeve and the electrical conductors are thus positively fixed also in the radial direction.

In particular, the assembly also comprises a fixing member which positively connects the basic body and the sleeve with each other.

Alternatively, the electrical conductors may be contacted directly via the end faces; however, they may also be electrically contacted at a different location and, depending on the embodiment, via an additional connecting member.

In another embodiment of the insulating connector with at least two electrical conductors, the electrical conductors are arranged parallel to each other within the basic body. In this context, parallel means that imaginary center axes of the electrical conductors, for example, which follow the course of the individual conductors, run substantially parallel to one another. Due to the parallel arrangement of the electrical conductors, the latter may be arranged in a space-saving manner, and the insulating connector may be configured in a correspondingly space-saving manner.

An angled arrangement of the center axes of the individual electrical conductors would also be conceivable, with the center axes following the course of the electrical conductors. Depending on the application, one option would be a 90° arrangement of the electrical conductors to be contacted.

In another embodiment of the insulating connector with at least two electrical conductors, the electrical conductors have an insulation layer, which is removed in a region of the contacting of the electrical conductors. For a better contacting of the electrical conductors, it may be advantageous if the electrical conductors, which are generally insulated throughout their length, are freed from their insulating layer in a contact region within the insulating connector. For this purpose, the insulation is removed from the electrical conductors at their ends to be contacted over a length of usually 5 to 15 times their metallic diameter.

BRIEF DESCRIPTION OF THE DRAWINGS

The present invention is explained in detail below based on exemplary embodiments with reference to the attached Figures. In the Figures.

DETAILED DESCRIPTION

Figure 1:
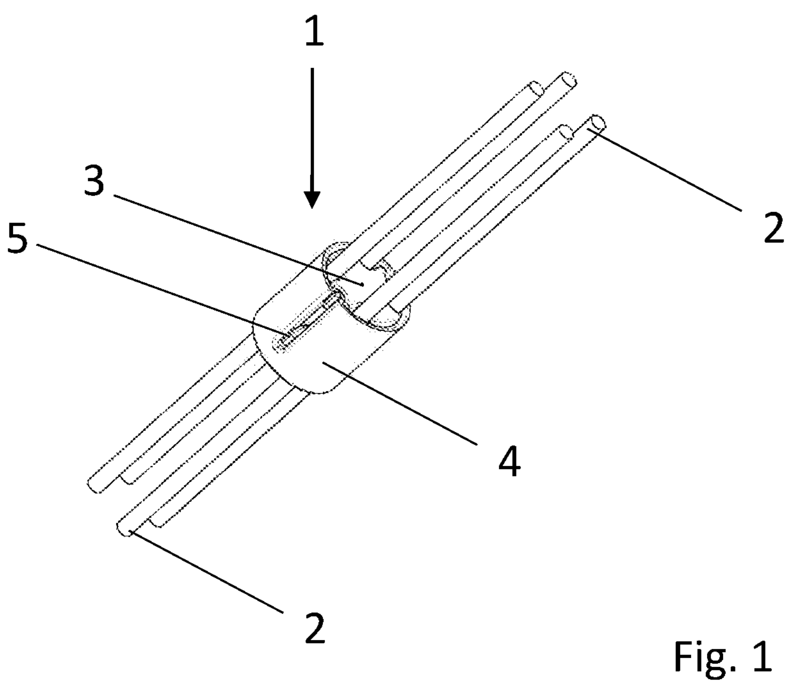
FIG. 1 shows an embodiment of an insulating connector for contacting eight electrical conductors, with a basic body, a sleeve and a fixing member.

Unless otherwise stated, identical reference numerals in the Figures denote identical components, or components corresponding to one another, with the same function.

FIG. 1 shows an embodiment of an insulating connector 1 for contacting four conductor pairs composed of eight electrical conductors 2. The insulating connector 1 has a basic body 3, a sleeve 4 and a fixing member 5.

Of the eight electrical conductors 2, two electrical conductors 2 are in each case electrically contacted with each other. For this purpose, the contacted electrical conductors 2 are inserted into the insulating connector 1 in an opposing manner in each case.

The basic body 3 is made from a ceramic material and respectively accommodates the contacted electrical conductors 2 in cut-outs 6 (in this respect, see FIG. 4), so that non-contacted electrical conductors 2 are spatially separated from one another and thus electrically insulated, because the ceramic material of the basic body 3 is not electrically conductive.

In order for the electrical conductor 2 to remain in their position, they are fixed in the cut-outs 6 by a ceramic sleeve 4. For this purpose, the sleeve 4 is pushed over the basic body 3 along the electrical conductors 2. In the process, the electrical conductors 2 are clamped into recesses 9 and thus fixed on the basic body 3. The recesses 9 can be seen in FIG. 4.

In order for the sleeve 4 to remain in its position relative to the basic body 3, a fixing member 5 in the form of a clamp is provided. The fixing member 5 positively connects the sleeve 4 with the basic body 3 by the fixing member 5 latching into corresponding cut-outs 7 in the sleeve 4 and the basic body 3 and reaching behind the sleeve 4. The fixing member 5 is configured like a snap-fit connection. Therefore, the connection can be disengaged again by displacing the fixing member 5, so that the sleeve 4 and the basic body 3 can be separated from each other.

Figure 2:
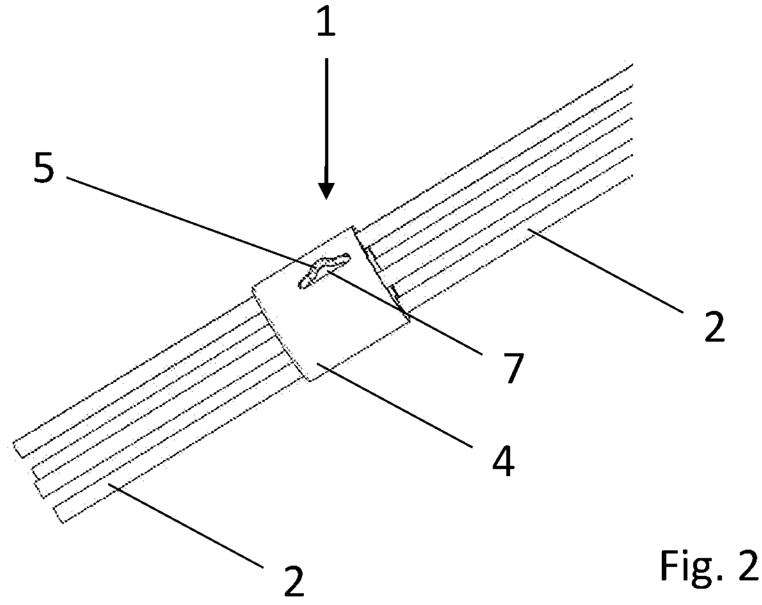
FIG. 2 shows the embodiment of the insulating connector from FIG. 1 in a different perspective.

FIG. 2 shows the embodiment of the insulating connector 1 from FIG. 1 in a different perspective. In this illustration, the fixing member 5 is easy to recognize. It comprises a wire brought into shape, which is seated in a recess 7 of the sleeve 4. By pushing in the part of the fixing member 5 protruding from the sleeve 4, the fixing member 5 can be disengaged again, and the sleeve 4 can be pushed off the basic body 3. Thus, the electrical conductors 2 are exposed and can be removed again from the insulating connector 1.

Figure 3:
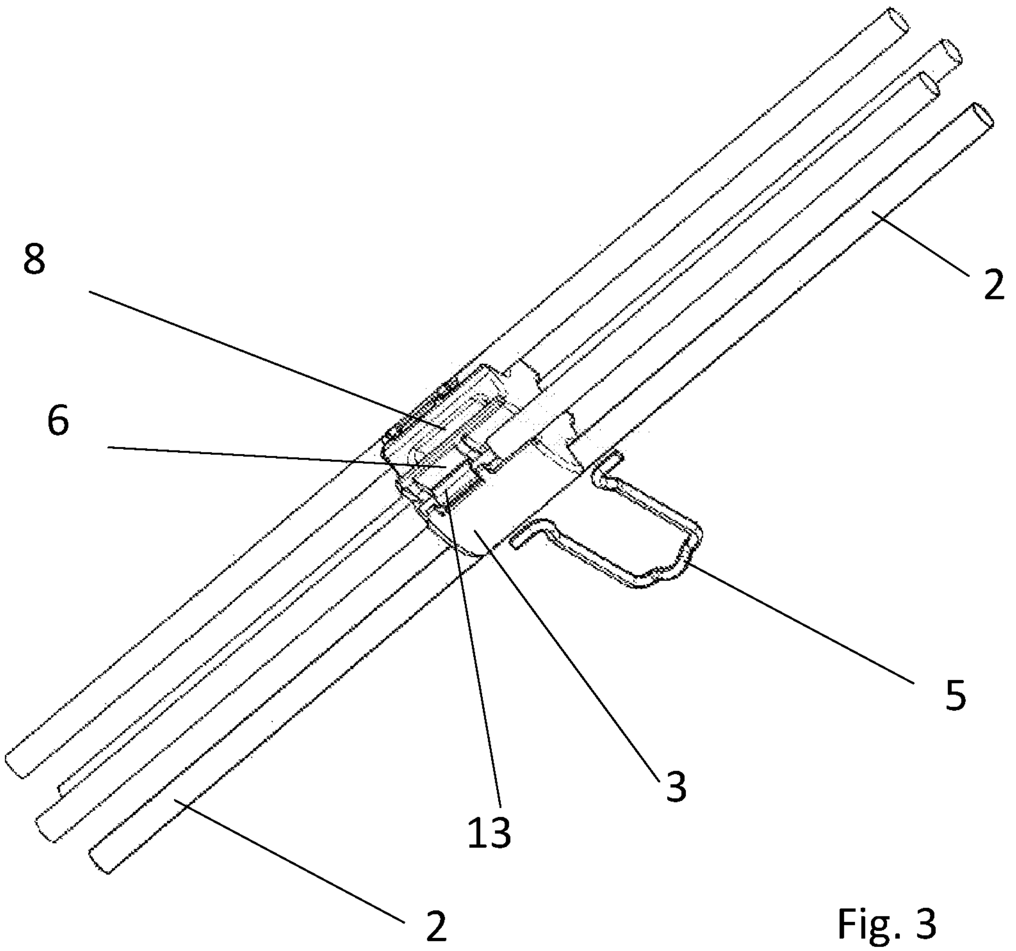
FIG. 3 shows the embodiment of the insulating connector from FIG. 1 with a view onto the basic body on the inside of the insulating connector without a sleeve.

FIG. 3 shows the embodiment of the insulating connector 1 from FIGS. 1 and 2 with a view onto the basic body 3 on the inside of the insulating connector 1 without a sleeve 4. For separating the basic body 3 and the sleeve 4, the fixing member 5 is removed from the insulating connector 1. The basic body 3 has a through-hole 8 for accommodating the fixing member 5. In the engaged state, the fixing member 5 can thus reach into the sleeve 4 on both sides of the basic body 3 and positively connect the two components with each other.

The cut-outs 6 for accommodating the electrical conductors 2 are easy to recognize. In the cut-outs 6, the electrical conductors 2 are mechanically and electrically connected, in each case in pairs, using connecting members 13.

Webs of the ceramic material of the basic body 3 remain between the cut-outs 6, so that the contacted pairs of the electrical conductors 2 are insulated from one another.

Figure 4:
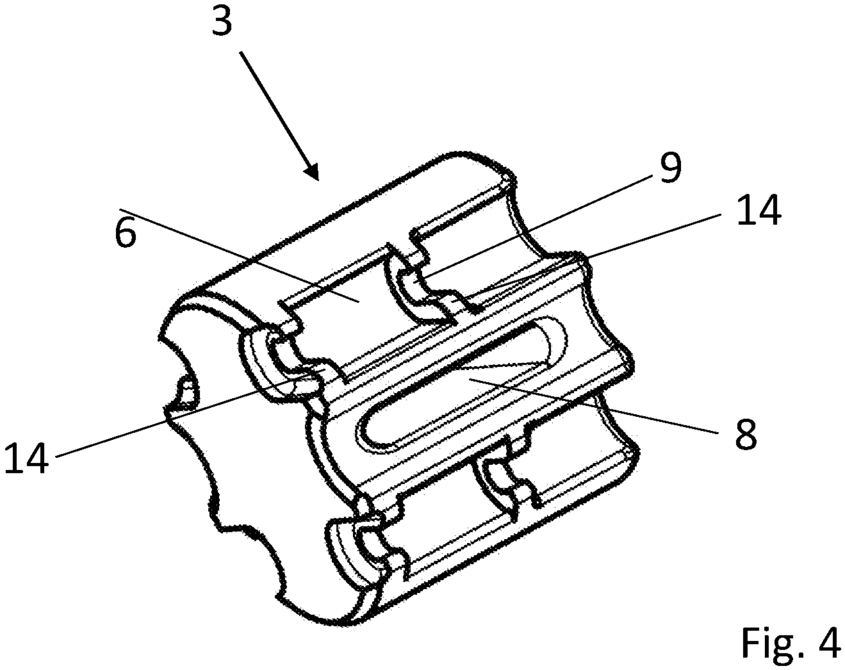
FIG. 4 shows the basic body of the embodiment of the insulating connector from FIG. 1.

FIG. 4 shows the basic body 3 of the embodiment of the insulating connector 1 of FIG. 1. The electrical contact connection of the electrical conductors 2 is realized by means of the connecting members 13 (see FIG. 2). The connecting members 13 are configured as crimp connectors whose diameter is greater than the diameter of the electrical conductors 2. The connecting members 13 are disposed in the cut-outs 6. Stops 14 are provided in the cut-outs 6. In this case, the stops 14 are in each case provided laterally of the connecting members 13. The stops 14 have recesses 9. In this case, the recesses 9 are configured such that they are configured to be smaller than the dimensions of the connecting members 13 and larger than the diameter of the electrical conductors 2. In this way, the connecting members 13 cannot slip out of the basic body 3 along the direction of the electrical conductors 2. The electrical conductors 2, or only the stranded wires of the electrical conductors 2, extend through the recesses 9.

When the sleeve 4 is pushed onto the basic body 3, the cut-outs 6 are closed by the sleeve 4, so that the connecting members 13, together with the electrical conductors 2, are fixed in their position and are unable to slip out of the basic body 3 laterally, or in the radial direction of the electrical conductors 2.

Figure 5:
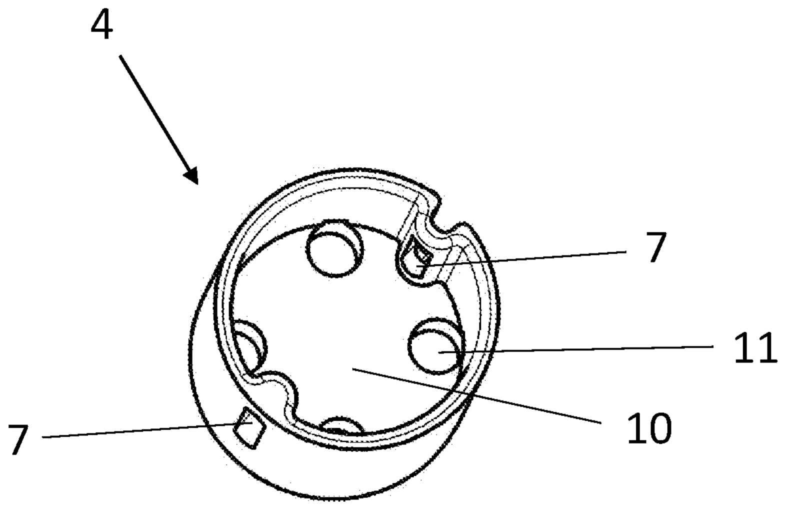
FIG. 5 shows the sleeve of the embodiment of the insulating connector from FIG. 1.

FIG. 5 shows the sleeve 4 of the embodiment of the insulating connector 1 from FIG. 1. The sleeve 4 is configured to be substantially cylindrical or tube-shaped and integrally connected to the lid 10 on one side. In turn, the lid 10 has four passages 11 for guiding the electrical conductors 2 through. The side of the sleeve 4 opposite the lid 10 is configured to be open for accommodating the basic body 3.

The cut-outs 7 for the fixing member 5 are arranged opposite, in the jacket surface of the sleeve 4. The cut-outs 7 are configured such that the fixing member 5 can be pushed from the outside through the sleeve 4 and through the through-hole 8 of the basic body 3 and reaches into the cut-outs 7 on both sides of the sleeve 4.

Figure 6:
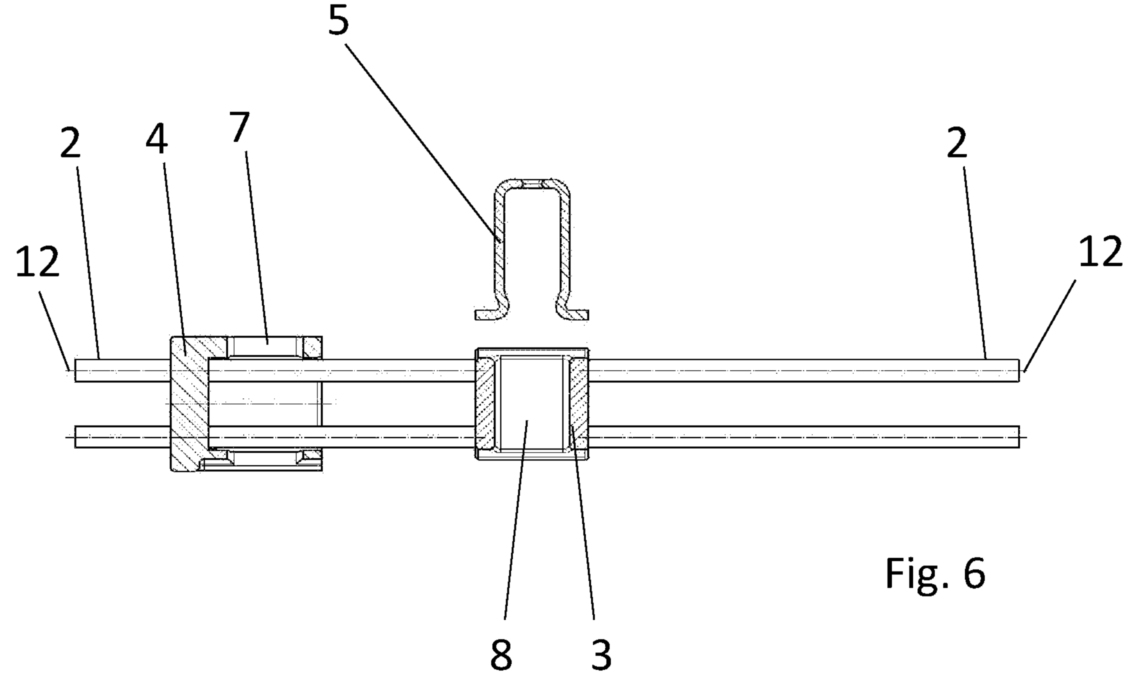
FIG. 6 shows a sectional view of the embodiment of the insulating connector from FIG. 1, with the sleeve in the released position.

FIG. 6 shows a sectional view of the embodiment of the insulating connector 1 from FIG. 1, with the sleeve 4 in the released position. The sleeve 4 can be brought into a released position in which the basic body 3 and the sleeve 4 are not connected with each other. In the released position, the electrical conductors 2 can be laid into the basic body 3 and are not completely fixed at first. Rather, by being laid into the basic body 3, the electrical conductors 2 are loosely guided so that they can end up in the completely correct position when the sleeve 4 is pushed on.

In the released position, the fixed position 5 is also not engaged with the sleeve 4 or the basic body 3. Thus, the sleeve 4 and the basic body 3 can move freely relative to one another in the released position.

In this illustration, the parallel arrangement of the electrical conductors 2 is illustrated by the depicted center axes 12. The center axes 12 of the electrical conductors 2 to be contacted coincide, so that the electrical conductors 2 to be contacted are arranged so as to be aligned with one another.

Figure 7:
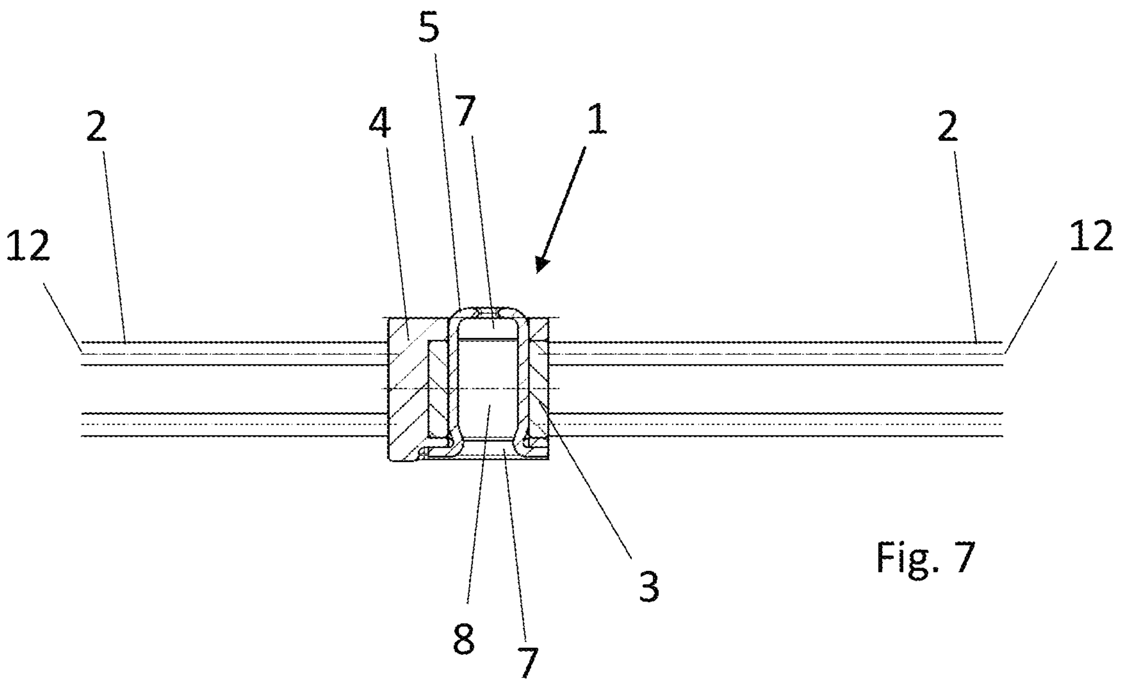
FIG. 7 shows a sectional view of the embodiment of the insulating connector from FIG. 1, with the sleeve in the fixed position.
Figure 8:
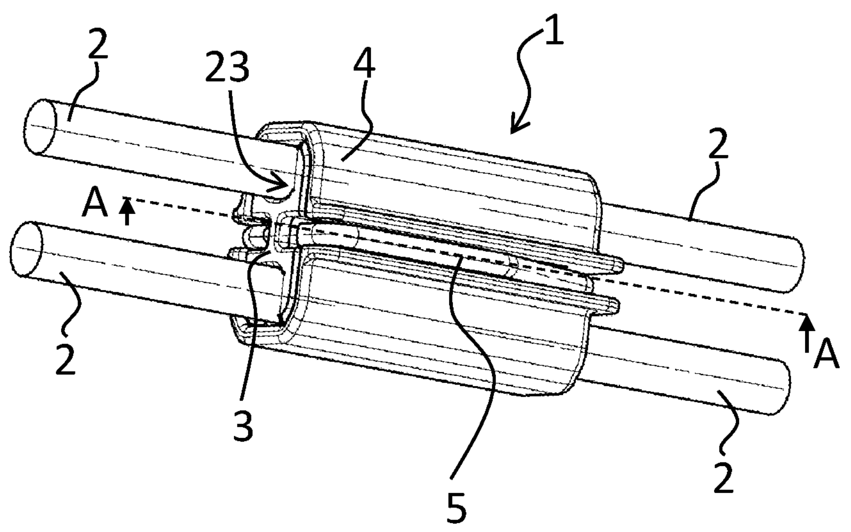
FIG. 8 shows a second embodiment of an insulating connector for contacting four electrical conductors, with a basic body, a sleeve and a fixing member.

FIG. 7 shows a sectional view of the embodiment of the insulating connector 1 from FIG. 1, with the sleeve 4 in the fixed position. If the sleeve 4 is completely pushed onto the basic body 3, the sleeve 3 is in the fixed position.

In the fixed position, the electrical conductors 2 are completely fixed by the electrical conductor 2 being routed through the recesses 9, while the connecting members 13 do not fit through the recesses 9.

In order for the sleeve 4 not to unintentionally leave the fixed position and release the electrical conductors 2 again, the fixing member 5 is pushed in so that the sleeve 4 is positively connected with the basic body 3. In the process, the fixing member 5 is pushed through the cut-out 7 of the sleeve 4 and the through-hole 8 of the basic body 3.

A second embodiment of the insulating connector 1 will be described below in connection with the FIG. 8 to 11.

Here, the insulating connector 1 is designed for contacting four electrical conductors 2, i.e. for contacting two pairs of electrical conductors 2 in each case.

Here, the insulating connector 1 also has a basic body 3. The basic body 3 is formed from a ceramic material. Here, the basic body 3 has a cuboid configuration and has a substantially rectangular cross section in this case. The basic body 3 is surrounded by a sleeve 4, and the basic body 3 and the sleeve 4 are positively connected with a fixing member 5 in a fixed position (see FIG. 8).

Figure 9:
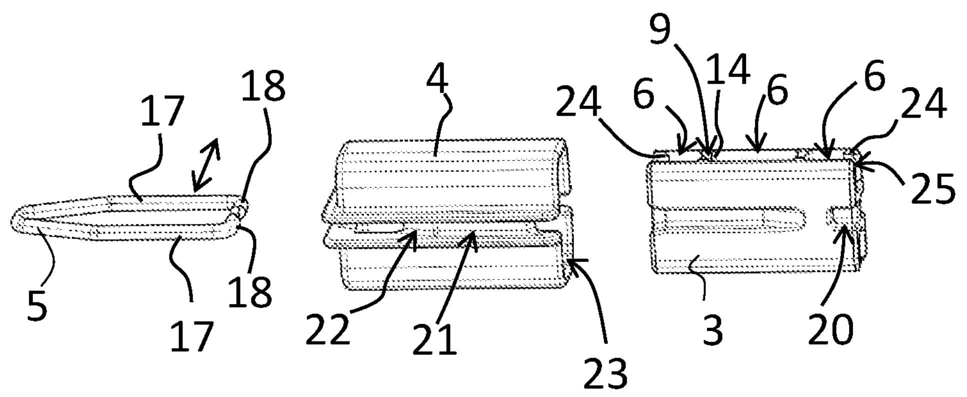
FIG. 9 shows the second embodiment with a basic body, a sleeve and a fixing member in an exploded view.
Figure 10:
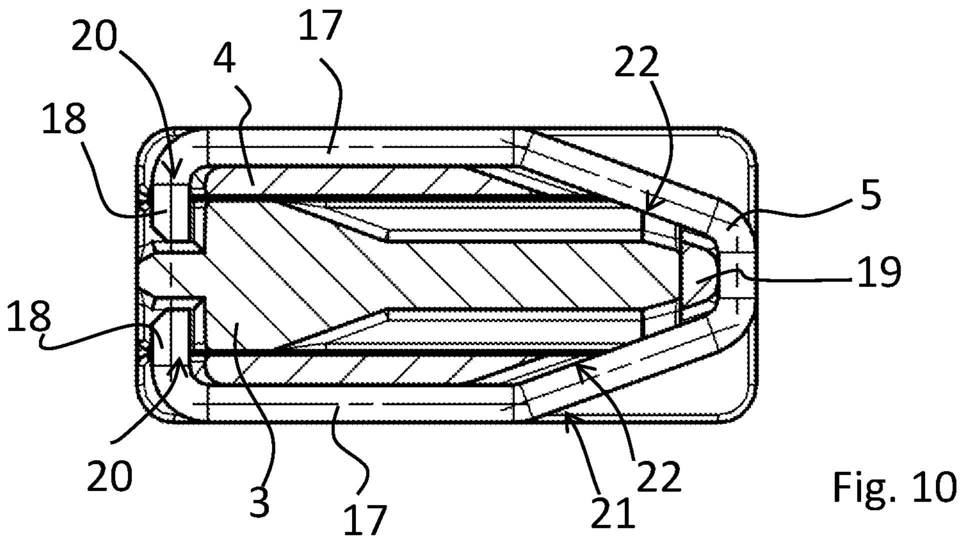
FIG. 10 shows the second embodiment in a cross section according to line A-A from FIG. 8.
Figure 11:
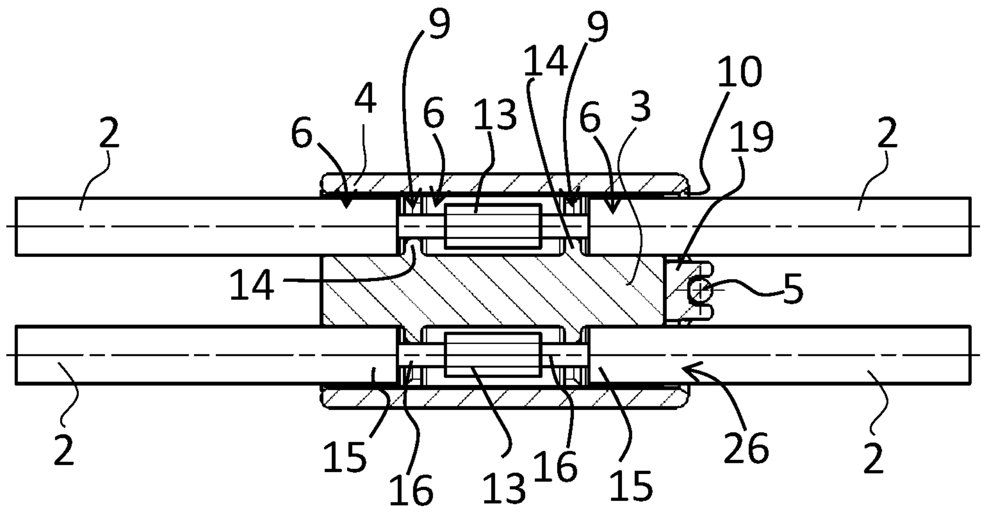
FIG. 11 shows the second embodiment in a longitudinal section perpendicular to the line of cut A-A.

As can be easily seen in FIGS. 9 and 11, the basic body 3 has two spaced-apart cut-outs 6, in each of which a pair of electrical conductors 2 is disposed. In the present case, two electrical conductors 2 are in each case connected with a connecting member 13 (crimp). For this purpose, an insulation 15 of the electrical conductors 2 is removed at the ends of the electrical conductors 2 to be connected in each case, in order to expose stranded wires 16. The exposed stranded wires 16 are surrounded by the connecting member 13.

In order to prevent the electrical conductors 2 from being removed from the insulating connector 1 in the longitudinal direction of the electrical conductors 2, two spaced-apart stops 14 are formed in the cut-outs 6. The stops 14 are spaced-apart such that the connecting member 13 is arranged between the stops 14 and the connecting member 13 is laterally, i.e. in the longitudinal direction of the electrical conductors 2, positively delimited by the stops 14. The stops 14 have recesses 9 through which the electrical conductors 2 or the stranded wires 16 are routed. In this case, the stops 14 are configured as material webs protruding into the cut-outs 3.

Here, the cut-outs 6 are open on the sides (see FIG. 9), so that a pair of electrical conductors 2 already connected with a connecting member 13 can be laid into the cut-outs 3 laterally, in the radial direction.

Besides the basic body 3, the insulating connector 1 also includes the ceramic sleeve 4, which here surrounds the basic body 3 and can be pushed onto the basic body 3. The sleeve 4 is configured similarly to the first embodiment described in FIGS. 1 to 7, with a lid 10 with two openings 26 (see FIG. 11) for passing through the electrical conductors 2 and an opening 23 for introducing the basic body 3. The sleeves 3 serves for positively fixing the electrical conductors 2 in the radial direction in the basic body 3.

The fixing member 5 is provided for connecting the basic body 3 and the sleeve 4 with each other. Here, the fixing member 5 is configured as a kind of wire strap with two legs 17, which can be resiliently moved or spread towards and apart from each other in a spring-elastic manner (see double-headed arrow in FIG. 9). The ends of the legs 17 have a bent fixing portion 18, which extends perpendicularly to the legs 17 here.

In this second embodiment, the fixing member 5 is arranged along the outside of the sleeve 4 (and of the basic body 3) in the fixed position. In the fixed position (see FIG. 10), the fixing member 5 rests against a channel-shaped protrusion 19 (see FIGS. 10 and 11) on the sleeve 4, and the fixing member 5 reaches behind the basic body 3 with the fixing portions 18 on the legs 17. For this purpose, the basic body 3 has, in each case, depressions 20 into which the fixing portions 18 of the legs 17 reach.

To protect the fixing member 5, the sleeve 4 has a groove 21, which in each case extends parallel to and between the electrical conductors 2 and in which the legs 17 of the fixing member 5 are accommodated.

For installing the fixing member 5, the sleeve 4 has an inclined portion 22 on each side. When the fixing member 5 is inserted, the two legs 17 are guided with the fixing portions 18 along the inclined portions 22 and pushed apart by the inclined portions 22, and in the fixing position, the legs 17 then snap with the fixing portion 18 into the depressions 20 behind the basic body 3.

In the region of insertion openings 25 for the electrical conductors 2 into the basic body 3, the basic body 3 has thickened portions 24 (see FIG. 9).

REFERENCE SIGNS LIST

1 Insulating connector
2 Electrical conductor
3 Basic body
4 Sleeve
5 Fixing member
6 Cut-out for electrical conductor
7 Cut-out for fixing member
8 Through-hole
9 Recesses
10 Lid
11 Passage
12 Center axis
13 Connecting member
14 Stop
15 Insulation
16 Stranded wire
17 Leg
18 Fixing portion
19 Protrusion (sleeve)
20 Depression (basic body)
21 Groove
22 Inclined portion
23 Opening (sleeve)
24 Thickened portion
25 Insertion opening (basic body)
26 Opening (sleeve)

The invention claimed is:

1. An insulating connector comprising a ceramic basic body for accommodating at least two electrical conductors having an elongated shape, wherein one electrical conductor, respectively, is contacted with another electrical conductor, wherein the insulating connector comprises a ceramic sleeve that can assume a released position and a fixed position, wherein the electrical conductors are fixed by the sleeve to the ceramic basic body in the fixed position, and the sleeve is formed in one piece, and the sleeve and ceramic basic body are adapted to one another so that the sleeve can be pushed laterally onto the ceramic basic body in the longitudinal dimension of the electrical conductors.

2. The insulating connector according to claim 1, wherein the sleeve substantially encloses the basic body.

3. The insulating connector according to claim 1, wherein the sleeve has a substantially cylindrical shape with openings for accommodating the basic body, preferably has a tube-like shape.

4. The insulating connector according to claim 1, wherein the sleeve and the basic body are adapted to one another such that the sleeve can be pushed onto the basic body, preferably can be pushed onto the basic body along the electrical conductors.

5. The insulating connector according to claim 1, wherein the sleeve has at least one opening through which the electrical conductors can be inserted.

6. The insulating connector according to claim 1, wherein the basic body and the sleeve can be coupled to each other in the fixed position of the sleeve by means of a fixing member, preferably, that the basic body and the sleeve are coupled to each other by a positive connection of the fixing member.

7. The insulating connector according to claim 6, wherein the fixing member can be detached without tools, so that the sleeve can be brought into the released position or into the fixed position.

8. The insulating connector according to claim 1, wherein the basic body has electrical connecting members for contacting the electrical conductors.

9. The insulating connector according to claim 8, wherein the electrical connecting members electrically contact the electrical conductors by the sleeve being pushed onto the basic body.

10. The insulating connector according to claim 1, wherein the basic body has cut-outs for accommodating the electrical conductors, preferably cut-outs for accommodating connecting members.

11. The insulating connector according to claim 10, wherein stops are formed in each case in the cut-outs.

12. The insulating connector according to claim 1, wherein the basic body has a substantially cylindrical shape.

13. The insulating connector according to claim 1 with at least two electrical conductors, wherein the basic body is configured such that electrical conductors not to be contacted are arranged in spatial separation from one another, preferably arranged in spatial separation from one another by separating members, particularly by ceramic molded-on portions.

14. An assembly comprising an insulating connector according to claim 1 and at least two conductors, the conductors arranged in the ceramic base body of the insulating connector with the ceramic sleeve surrounding the base body in such a way that the electrical conductors are fixed in the ceramic base body in a fixed position of the sleeve, wherein the electrical conductors have end faces at one end, wherein the end faces are arranged opposite each other in the basic body in the case of contacted electrical conductors.

15. An assembly comprising an insulating connector according to claim 1 and at least two conductors, the conductors arranged in the ceramic base body of the insulating connector with the ceramic sleeve surrounding the base body in such a way that the electrical conductors are fixed in the ceramic base body in a fixed position of the sleeve, wherein the electrical conductors are arranged parallel to each other within the basic body.

16. An assembly comprising an insulating connector according to claim 1 and at least two conductors, the conductors arranged in the ceramic base body of the insulating connector with the ceramic sleeve surrounding the base body in such a way that the electrical conductors are fixed in the ceramic base body in a fixed position of the sleeve, wherein the electrical conductors have an insulation layer, which is removed in a region of the contacting of the electrical conductors.

* * * * *